S. N. CARVALHO,

Assignor to J. S. CARVALHO.

APPARATUS FOR SUPERHEATING STEAM OR HEATING AIR.

No. 10,124. Reissued May 30, 1882.

WITNESSES:

Geo. Finck

W Bradley

INVENTOR

J. S. Carvalho

BY

ATTORNEY

UNITED STATES PATENT OFFICE.

SOLOMON N. CARVALHO, OF NEW YORK, N. Y., ASSIGNOR TO JACOB S. CARVALHO, OF SAME PLACE.

APPARATUS FOR SUPERHEATING STEAM OR HEATING AIR.

SPECIFICATION forming part of Reissued Letters Patent No. 10,124, dated May 30, 1882.

Original No. 249,502, dated November 15, 1881. Application for reissue filed April 10, 1882.

*To all whom it may concern:*

Be it known that I, SOLOMON N. CARVALHO, of the city, county, and State of New York, have invented certain new and useful Improvements in Methods of and Apparatus for Superheating Steam or Heating Air, of which the following is a specification.

The object of this invention is to furnish an improved apparatus for superheating steam or heating air to any desired degree of temperature, and for controlling the same for application in the arts; and to this end I employ a retort having an outer casing, in combination with an interior casing, provided with a central diaphragm, which passes from the upper end to a point near the bottom of the interior casing, dividing it into equal spaces, which communicate with the steam or air conducting pipes at opposite sides of the diaphragm. For controlling the temperature of the steam or air to be heated, a pyrometer or heat-gage is arranged in the eduction-pipe, and it is connected by a lever arrangement with a valved air-pipe at the upper part of the exterior casing of the retort, so as to regulate the temperature by the admission of cooler air through a pipe at the lower part of the outer casing. For increasing the heating-surface, the exterior and interior casings are provided with exterior and interior longitudinal ribs.

Figure 1:
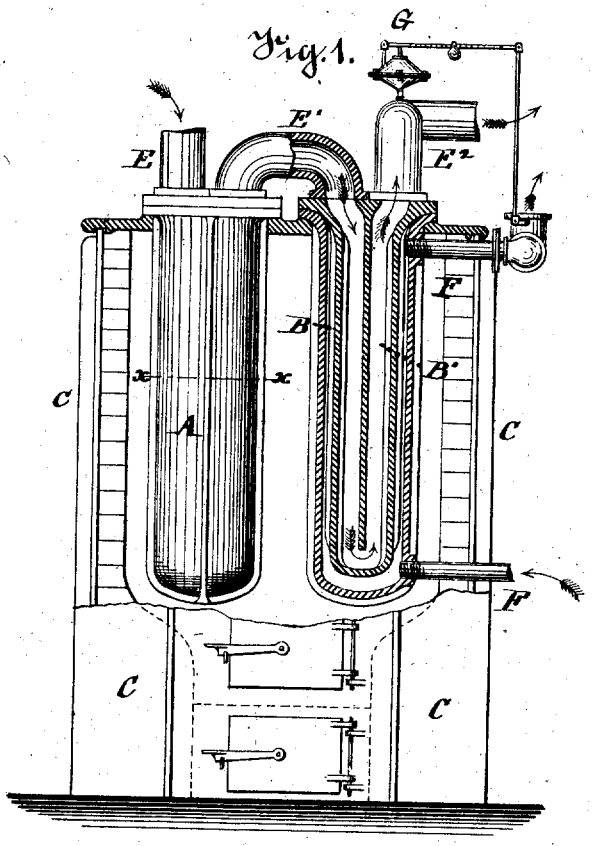
Figure 2:
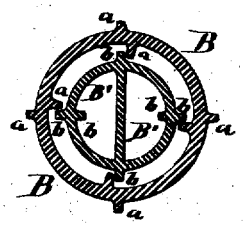
Figure 3:
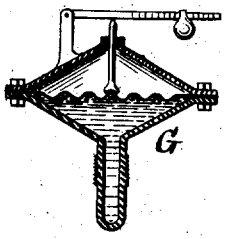

In the accompanying drawings, which fully illustrate my invention, Figure 1 represents a side elevation, partly in section, of my improved apparatus for superheating steam or heating air, one retort being shown in side view, the other in vertical central section. Fig. 2 is a horizontal section of one of the retorts on line *x x*, Fig. 1. Fig. 3 is a vertical central section of the pyrometer or heat-gage employed. Similar letters of reference indicate corresponding parts.

My improved apparatus for superheating steam or heating air is composed of one or more retorts, A A, which are made preferably of cylindrical shape and of cast-iron or other suitable material. The retorts may be arranged in battery, and are heated by the fire from a furnace, C. The retorts are supported by the brick walls of the furnace within which they are suspended. Each retort consists of an exterior casing, B, and an interior casing, B′. The interior casing, B′, of each retort is divided into two semi-sections by a central longitudinal diaphragm, D. The upper ends of the inner casing are enlarged and formed with apertures of the same diameter as the steam or air conducting pipes E E′ $E^2$ attached thereto, as seen in Fig. 1. The diaphragm D is fixed to the upper end between the apertures, and extends to such distance from the bottom of the casing as allows a current of air to pass around it. The exterior cylinder or casing, B, of each retort is of larger diameter than the interior cylinder or casing, B′, and open at one end, where it receives the interior cylinder or casing, B′, placed within it. The flange of the interior cylinder or casing, B′, is secured to the flange of the exterior cylinder or casing, B, which rests on plates in the furnace-wall, as shown in Fig. 1. An annular inclosed space is thus formed between the exterior and interior cylinder or casing of each retort without communication between this annular space and the interior of the inner cylinder or casing. The longitudinal ribs at the outside and inside, with which the cylinders or casings are provided when it is desired to increase the heating-surface, are shown in Figs. 1 and 2.

The ribs *a* or *b* of one casing may be placed in contact with those of the other casing, so as to furnish a larger heat absorbing and conducting surface. The steam or air to be heated passes through an induction-pipe, E, to the interior casing, B′, at one side of the diaphragm D, and around the lower edge of the diaphragm to the other side of the casing, and from the upper part of the inner casing through a connecting-pipe, E′, to the next retort, and so on, through all the retorts, until finally carried off by the eduction-pipe $E^2$. The air which fills the annular space between the inner and outer cylinder of each retort is heated by the fire in the furnace C below the same, and this intermediate body of air prevents the direct contact of the fire with the inner casing, and consequently protects the same against the injurious effect of the direct fire. It furnishes thereby a permanent, reliable, and economically-working apparatus for the superheating of steam and heating of air, and for adding thereto as many units of extra heat as may be required.

In connection with the annular space between the two cylinders are used regulating air outlet and inlet pipes F F′ near the top and bottom of the outer casing, of which the upper pipe, F, is closed by a valve that is connected by a crank-arm and lever-rod with the weighted lever-arm of a pyrometer or heat-gage arranged in the eduction-pipe $E^3$ of the apparatus.

The pyrometer is shown in detail in Fig. 3, and consists of a corrugated diaphragm, upon the lower surface of which acts a body of mercury or other expanding metal, the expansion of the mercury operating the diaphragm and, by a vertically-guided spindle, the lever-arm which actuates the valve of the air-pipe F. By adjusting the pyrometer or heat-gage to a certain temperature it will automatically operate the valve of the air-outlet pipe F, whenever the required temperature is reached, so as to cause the escape of some of the air of high temperature from the space between the cylinders through pipe F, and the entrance of a supply of cold air through the lower pipe, F′. This will reduce the temperature and regulate in this manner automatically the exact degree to which the steam or air is to be heated.

Having thus described my invention, I claim as new and desire to secure by Letters Patent—

1. In an apparatus for superheating steam or heating air, a retort composed of an exterior and an interior casing, the latter provided with a longitudinal diaphragm which extends centrally through it to a point at some distance from the bottom of the same, substantially as set forth.

2. In an apparatus for superheating steam or heating air, a retort composed of an interior and an exterior casing, the former having a central longitudinal diaphragm extending to a point at some distance from the bottom, both casings being provided with longitudinal ribs for increasing the heating-surface, substantially as specified.

3. In an apparatus for superheating steam or heating air, the combination, with a retort composed of an interior and exterior casing, of inlet and outlet pipes connected to the outer casing and mechanism whereby the temperature to which the steam or air which is to be heated is controlled by the admission of cold air, substantially as specified.

In testimony that I claim the foregoing as my invention I have signed my name in presence of two witnesses.

S. N. CARVALHO.

Witnesses:
GEO. FINCK,
GEO. B. ASHLEY.